United States Patent

Thomenius et al.

Patent Number: 6,066,099
Date of Patent: May 23, 2000

[54] METHOD AND APPARATUS FOR HIGH-FRAME-RATE HIGH-RESOLUTION ULTRASONIC IMAGE DATA ACQUISITION

[75] Inventors: Kai Erik Thomenius, Clifton Park, N.Y.; Seth David Silverstein, Charlottesville, Va.

[73] Assignee: General Electric Company, Schenectady, N.Y.

[21] Appl. No.: 09/197,744

[22] Filed: Nov. 23, 1998

[51] Int. Cl.[7] .................................................. A61B 8/00
[52] U.S. Cl. ................................................... 600/447
[58] Field of Search ........................ 600/437, 440–441, 600/443, 447, 454–456, 458; 128/DIG. 16; 73/625–626; 367/7, 11, 103

[56] References Cited

U.S. PATENT DOCUMENTS

| | | | |
|---|---|---|---|
| 5,469,851 | 11/1995 | Lipschutz | 600/447 |
| 5,623,928 | 4/1997 | Wright et al. | 600/447 |
| 5,647,365 | 7/1997 | Abboud | 600/447 |
| 5,891,038 | 4/1999 | Seyed-Bolorforosh et al. | 600/447 |
| 5,905,692 | 5/1999 | Dolazza et al. | 600/447 |
| 5,976,089 | 11/1999 | Clark | 600/447 |

*Primary Examiner*—Francis J. Jaworski
*Attorney, Agent, or Firm*—Marvin Snyder; Douglas E. Stoner

[57] ABSTRACT

Data for high-frame-rate high-resolution (i.e., low f-number) ultrasonic imaging are acquired by a technique that involves transmitting multiple physically separated beams simultaneously and acquiring imaging data for more than one scan line during receive. Spatial apodization is used to influence the transmit beamformation and to form two controlled and focused spatially separate beams with a single firing of the transducer array elements and without use of additional timing electronics.

12 Claims, 4 Drawing Sheets

METHOD AND APPARATUS FOR HIGH-FRAME-RATE HIGH-RESOLUTION ULTRASONIC IMAGE DATA ACQUISITION

FIELD OF THE INVENTION

This invention generally relates to ultrasound imaging systems and, more particularly, to methods and apparatus for increasing the acoustic frame rate of ultrasound images.

BACKGROUND OF THE INVENTION

The ideal ultrasound system will maintain its imaging resolution at an optimum value throughout the area of interest. One method for accomplishing this is often referred to as beamformation with the complete data set or $N^2$ reconstruction. With this method, the data acquisition sequence proceeds as follows: transmit with transducer element 1, receive with transducer elements 1 through N; transmit with transducer element 2, receive with transducer elements 1 through N; and so forth.

Since this approach requires $N^2$ transmit/receive operations, it is not feasible for clinical imaging due to the data acquisition time requirements. However, it facilitates a beamformation process in which each individual pixel of the image has its own specific set of beamformation parameters. By this method, one can achieve dynamic focusing on transmit beamformation as well as with receive beamformation. Therefore, $N^2$ reconstruction is often considered the target or the point of comparison by which clinically feasible approaches are measured. Thus a data acquisition method which approaches the $N^2$ method while minimizing the frame rate impact would be a desirable development.

A conventional ultrasound image is composed of multiple image scan lines. A single scan line (or small localized group of scan lines) is acquired by transmitting ultrasound energy focused at a point in the region of interest, and receiving the reflected energy over time. The focused transmit energy is referred to as a transmit beam. During the time after transmit, one or more receive beamformers coherently sum the energy received by each channel, with dynamically changing phase rotation or delays, to produce peak sensitivity along the desired scan lines at ranges proportional to the elapsed time. The resulting focused sensitivity pattern is referred to as a receive beam. Resolution of each scan line is a result of the directivity of the associated transmit and receive beam pair.

The beamformer channel output signals are coherently summed to form a respective pixel intensity value for each sample volume in the object region or volume of interest. These pixel intensity values are log-compressed, scan-converted and then displayed as an image of the anatomy being scanned.

The frame rate of medical ultrasound imaging systems is determined by the number of transmit events necessary per frame. In conventional ultrasound imaging systems, a transmit event is a transmit beam directed in a particular direction or at a particular focal position. Frame rate in medical ultrasound imaging is a valuable resource. With additional frame rate, larger regions (as in color flow imaging or three-dimensional imaging) or faster objects (e.g., the heart) can be imaged. In addition, image enhancement methods such as video integration (noise reduction) or compounding (speckle reduction) can also use up frame rate.

In conventional medical ultrasound imaging, a single pulse is transmitted in a particular direction and the reflected echoes are coherently summed to form a single line in the image frame. The amount of time necessary to form that scan line is determined largely by the round-trip transit time of the ultrasonic pulse. Furthermore, many scan lines are present in an image frame to densely sample the anatomical region of interest. Thus the frame rate in conventional medical ultrasound imaging is determined by the sound propagation speed and the size of the region of interest.

High-frame-rate systems are desirable for 2D imaging and necessary for future real-time 3D imaging. The frame rate can be improved by decreasing the number of transmit events per frame. This has been conventionally accomplished with a proportional reduction in the number of transmit elements used in each transmit event, which results in poor signal-to-noise ratio (SNR). A decrease in the number of transmit events per frame has been conventionally accomplished only with an accompanying reduction in the number of transmit elements, which results in very poor SNR.

Conventional ultrasound beamformers use dynamic focusing during reception of echoes. With this method, the beamformation process is optimized for each depth to achieve as good a beamshape (i.e., narrow beamwidth with low sidelobes) as possible. However, in most systems, a single fixed focus is used during transmit beamformation to try to maintain a good combined beamshape. In areas away from the transmit focus, the beamwidth of the resultant beam widens and the sidelobes increase.

In one known ultrasound imaging system, an improvement to the focal properties is achieved by using multiple transmits aimed at different focal locations or zones. The echoes from these focal zones are used to form subimages, which then are stitched together in the final image. While this method optimizes beam properties in most areas of the image and hence begins to approximate $N^2$ performance, this occurs at a major penalty of frame rate, i.e., the speed of sound is sufficiently slow to bring the frame rates down to as low as 5 frames/sec. In typical cases as many as eight transmit focal locations are used, which brings about an 8-fold reduction in frame rate. This penalty is quite severe with lower-frequency probes that are used in clinical situations requiring deep penetration.

A similar limitation associated with the data acquisition time occurs even more seriously with color flow mapping, a Doppler-based technique in which 4 to 16 transmissions are typically made in a direction of interest to acquire enough data for clinical utility. One approach that has been implemented to try to overcome this limitation is that of transmitting a wider beam and placing multiple receive beams within the transmit envelope. The resultant beams are not necessarily of good quality; however, given the relatively modest needs of Doppler processing, the method works satisfactorily. The quality of such beams is not sufficient for B-mode imaging. Hence, there is a significant need to acquire data at a faster rate and for that data to be of sufficient quality to form competitive images.

SUMMARY OF THE INVENTION

Data for high-frame-rate high-resolution (i.e., low f-number) ultrasonic imaging are acquired by transmitting multiple physically separated beams simultaneously and obtaining imaging data for more than one scan line during receive. Spatial apodization is used to influence the transmit beamformation and to form two controlled and focused spatially separate beams with a single firing of the transducer array elements and without use of additional timing electronics. This method will be referred to herein as "dual beam steering by apodization" and involves transmission of a single time-delayed focused signal that is separated simultaneously into two distinct beams by imposing a cosinusoidal apodization on the transmitted signals from the elements of the transmitting phased array.

This concept can be extended to provide improved performance for larger scan angles and larger angular separations of the dual beams. Moreover, an apodization methodology can be employed to extend the original concepts to multiple (more than two) transmit beams with a single transmit firing. It is also possible to apply this concept to two-dimensional arrays, which makes it possible to work with a two-dimensional set of transmit beams.

DETAILED DESCRIPTION OF THE PREFERRED EMBODIMENTS

Figure 1:
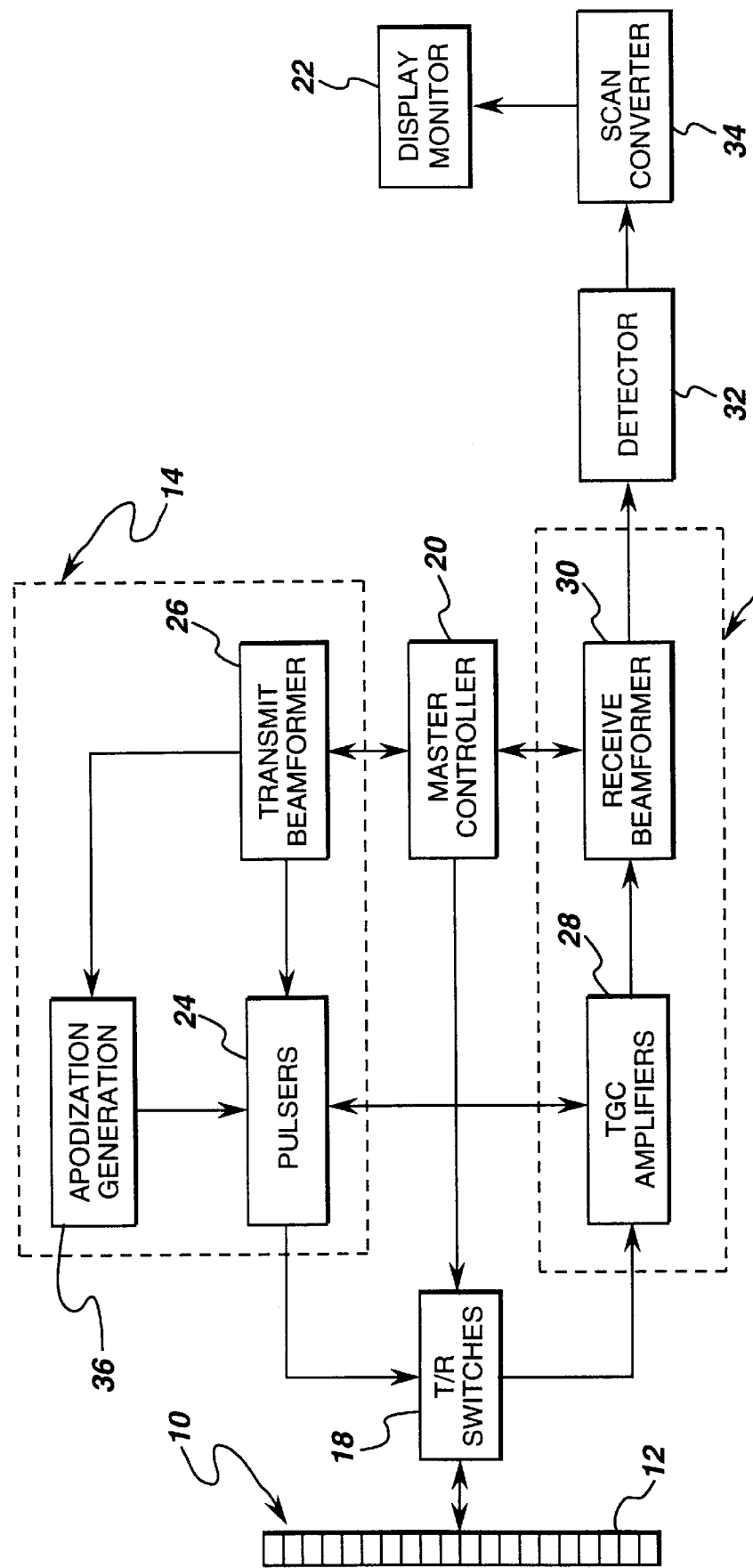
FIG. 1 is a block diagram of an ultrasound imaging system in accordance with the present invention.

As shown in FIG. 1, an ultrasonic imaging system incorporating the invention comprises a transducer array 10 made up of a plurality of separately driven transducer elements 12, each of which produces a burst of ultrasonic energy when energized by a pulsed waveform produced by a transmitter 14. The ultrasonic energy reflected back to transducer array 10 from the object under study is converted to an electrical signal by each receiving transducer element 12 and applied separately to a receiver 16 through a set of transmit/receive (T/R) switches 18. The T/R switches 18 are typically diodes which protect the receive electronics from the high voltages generated by the transmit electronics. The transmit signal causes the diodes to shut off or limit the signal to the receiver. Transmitter 14 and receiver 16 are operated under control of a master controller 20 responsive to commands by a human operator. A complete scan is performed by acquiring a series of echoes in which transmitter 14 is gated ON momentarily to energize each transducer element 12, and the subsequent echo signals produced by each transducer element 12 are applied to receiver 16. A channel may begin reception while another channel is still transmitting. Receiver 16 combines the separate echo signals from each transducer element to produce a single echo signal which is used to produce a line in an image on a display monitor 22.

Under the direction of master controller 20, transmitter 14 drives transducer array 10 such that ultrasonic energy is transmitted as two or more directed focused beams. To accomplish this, respective time delays are imparted to a multiplicity of pulsers 24 by a transmit beamformer 26. Master controller 20 determines the conditions under which the acoustic pulses will be transmitted. With this information, transmit beamformer 26 determines the timing and amplitudes of each of the transmit pulses to be generated by pursers 24. The amplitude of each transmit pulse will be generated by an apodization generation circuit 36, which may comprise a high-voltage controller that sets the power supply voltage to each pulser. Pulsers 24 in turn send the transmit pulses to each of elements 12 of transducer array 10 via T/R switches 18, which protect the time-gain control (TGC) amplifiers from the high voltages which may exist at the transducer array. The cosinusoidal (or other function) weightings are generated within apodization generation circuitry 36, which may comprise a set of digital-to-analog converters that take the weighting data from transmit beamformer 26 and apply them to pulsers 24.

Figure 2:
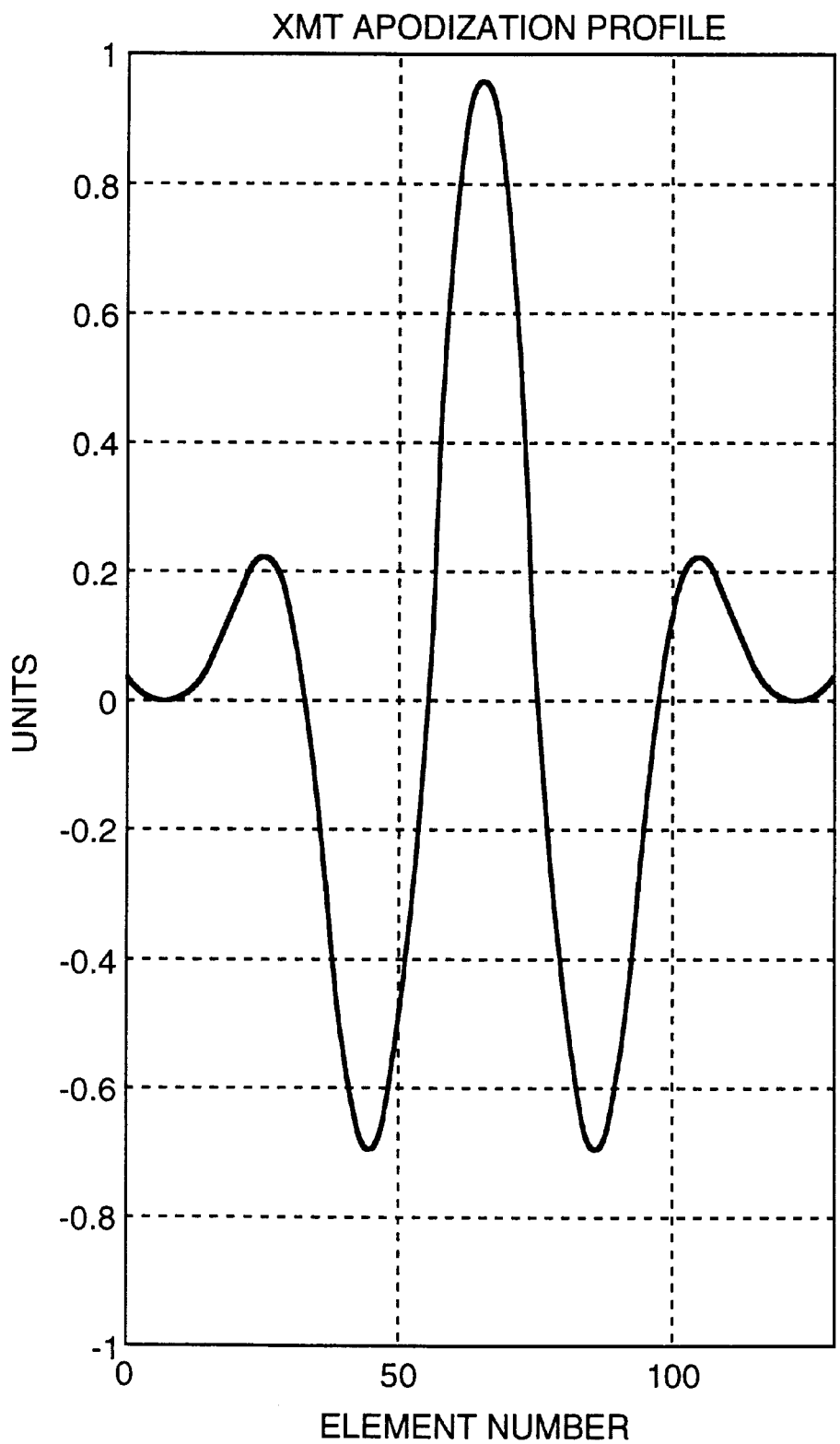
FIG. 2 is a graph showing the transmit apodization profile for transmission of a pair of steered ultrasound beams from a 128-element phased array in accordance with one preferred embodiment of the invention.

By appropriately adjusting the transmit focus time delays in a conventional manner and also adjusting the apodization weightings appropriately, two or more ultrasonic beams can be directed and focused at respective points during a single transmit firing. For example, FIG. 2 shows an apodization weighting function suitable for producing two spatially separate beams during a single transmit firing of transducer elements 12.

Figure 3:
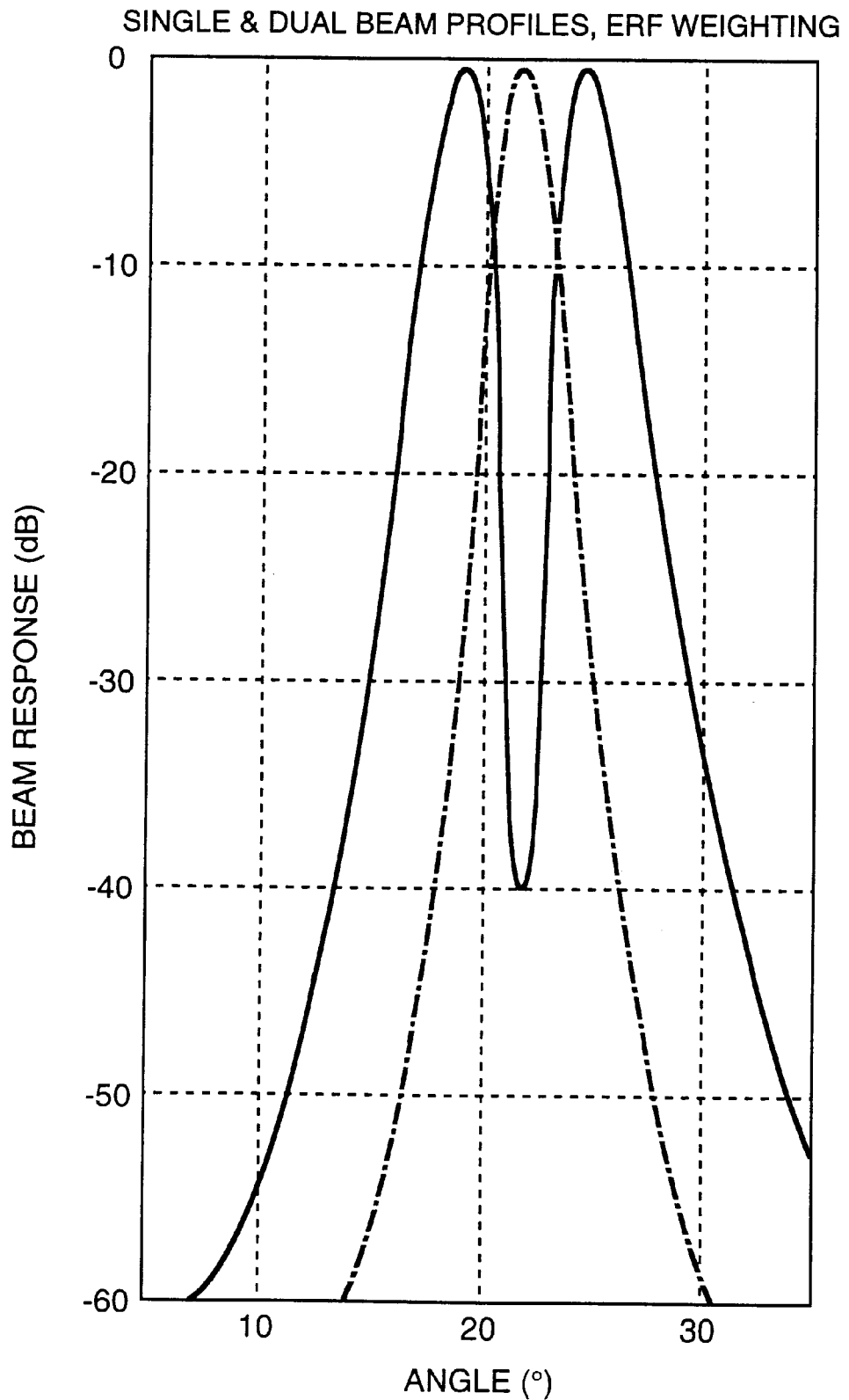
FIG. 3 is a graph showing the dual beam profile resulting from application of the transmit apodization weighting function shown in FIG. 2 (solid curve) and the single beam profile for transmission with the same f-number and without apodization.

The resulting two beams are represented by the dual peaks in the solid curve shown in FIG. 3. Removal of the apodization would cause a single beam to be formed, as indicated by the dashed curve in FIG. 3. The steering angle produced by the time delays is the average of the sines of the two angles of the two ultrasonic beams resulting from apodization in accordance with the preferred embodiment depicted in FIG. 2.

The echo signals produced by each burst of ultra-sonic energy reflect from objects located at successive ranges along each ultrasonic beam. The echo signals are sensed separately by each transducer element 12 and a sample of the magnitude of the echo signal at a particular point in time represents the amount of reflection occurring at a specific range.

Due to the differences in the propagation paths between a reflecting point and each transducer element 12, the echo signals are not detected simultaneously and their amplitudes are not equal. Receiver 16 amplifies the separate echo signals via a respective TGC amplifier 28 in each receive channel. The amount of amplification provided by the TGC amplifiers is controlled by a TGC circuit (not shown) that is set by hand operation of potentiometers. The amplified echo signals are then fed to receive beamformer 30. Each receiver channel of the receive beamformer is coupled to a respective one of transducer elements 12 by a respective TGC amplifier 28.

Under the direction of master controller 20, receive beamformer 30 tracks the directions of the two transmitted beams, sampling the echo signals at a succession of ranges along each beam. The receive beamformer imparts the proper time delay to each amplified echo signal and sums them to provide an echo signal which accurately indicates the total ultrasonic energy reflected from a point located at a particular range along one ultrasonic beam. Most conventional systems have the capability of receiving two beams simultaneously. This usually does not require two full sets of beamformer channels; in a digital beamformer, the separate beams are formed after several steps of common processing. Thus, the receive beamformer 30 generates two receive beams in a conventional manner, the receive beams corresponding to the two ultrasound beams transmitted at different angles. When conventional beamformers perform two-for-one receive beamformation, the transmit beam is usually widened to cover the area of the two receive beams. The present invention makes it possible to get dramatically improved beamformation (using two separate transmit beams) without the necessity of introducing any additional timing circuitry.

The receive focus time delays are computed in real-time using specialized hardware or read from a look-up table. The receive channels also include circuitry (not shown) for filtering the received pulses. The time-delayed receive signals are then summed and supplied to a signal processor or detector 32 which converts the summed received signals to display data. In the B-mode (grey-scale), the display data constitute the envelope of the summed signals with some additional processing, such as edge enhancement and logarithmic compression. A scan converter 34 receives the display data from detector 32 and converts the data into the desired image for display. In particular, scan converter 34 converts the acoustic image data from polar coordinate (R—θ) sector format or Cartesian coordinate linear array to appropriately scaled Cartesian coordinate display pixel data at the video rate. The scan-converted acoustic data are then produced for display on display monitor 22, which images the time-varying amplitude of the envelope of the summed signals as a grey scale. A respective scan line is displayed for each spatially separate beam transmitted during a single transmit firing.

Dual beam steering (later to be extended to more than two beams) by apodization in accordance with the invention can be explained in mathematical terms. The response of a narrowband beamformer near its focus is given by the following expression:

$$f(u) = \int_{-\infty}^{\infty} a(x) \exp(jk_0 xu) dx \quad (1)$$

where f(u) is the transmit response as a function of u=sin(θ), θ is the angle with respect to the array normal, and $k_0 = 2\pi/\lambda$ is the wave number. As is well known, this expression gives a Fourier transform relation between the aperture function a(x) and the field response as a function of u. In a typical ultrasound application, the function a(x) is used for the purpose of apodization, i.e., to suppress the sidelobes that arise as a consequence of the Gibbs phenomenon.

The technique in accordance with the dual beam steering embodiment of the invention uses the a(x) component of Eq. (1) to modify the beam pattern in a manner that allows formation of two or more transmit beams from a single transmission. It is well known from interferometry that use of two point sources will create a sinusoidal field distribution. This is a direct consequence of the Fourier transform characteristic of the narrow band far-field (or focal) beamformation. The present invention takes advantage of reciprocity in that if a sinusoidal weighting (apodization) is applied on the array elements, the field pattern will be that of two spatially separated δ-functions. In other words, if a weighting $$a(x) = \cos\left(\frac{2\pi x}{d}\right) \quad (2)$$

is applied, where d is the spatial frequency of the sinusoid, the resulting field pattern will be $$f(u) = \frac{L}{2}\left\{si\left[\pi L \frac{u+\lambda}{\lambda}\right] + si\left[\pi L \frac{(u-\lambda)}{\lambda}\right]\right\} \quad (3)$$

where the abbreviation "si" has been used for sinc (or sin(x)/x).

Thus, merely by introducing the cosinusoidal weighting function, two beams are transmitted during a single firing of a multiple-element phased array. This is accomplished without generation of any timing signals or other means usually used for such purposes. Equations (1)–(3) assume infinite apertures. If the aperture is assumed finite with a length L, the field response becomes the following:

$$f(u) = \frac{1}{2}\left\{\delta\left(u + \frac{\lambda}{d}\right) + \delta\left(u - \frac{\lambda}{d}\right)\right\}. \quad (4)$$

The a(x) function used to derive Eq. (4) is a rect{L} function, hence the sinc terms in the response. The rect-function can be defined as follows:

$$rect\{x\} = 1 \text{ if } x \leq \frac{L}{2}, \quad (5)$$

$$rect\{x\} = 0 \text{ if } x > \frac{L}{2}.$$

A more appropriate weighting function can be used to suppress sidelobes associated with the sinc function. FIG. 2 is an example of a sinusoidal weighting function with error function apodization superimposed on it for sidelobe suppression. The error function smoothes out the edges of the aperture response and is not necessary for implementation of the invention. FIG. 3 shows the resulting simulated beam-shape. In this instance the apodization causes two beams to be steered to the right at 19 and 25 degrees. Removal of the apodization while transmitting with the same f-number would cause a single beam to be formed, as depicted by the dash-dot line in FIG. 3; however, the single beam would not be exactly at 22 degrees. To get the two beams to show up at 19 and 25 degrees, the sine of the steering angle must be at the average of the sines of the two angles (i.e., [sin(19°)+ sin(25°)]/2).

Some loss in lateral and contrast resolution with the wideband signals may occur due to use of the cosinusoidal apodization. This, in effect, limits the aperture size in the simulation. In practice, this loss can be compensated for by using a lower f-number in situations where the dual beam performance is desired. Given a fairly large selection of possible apodization curves, the designer can optimize performance to the given situation.

A natural characteristic of sinusoidal or cosinusoidal functions makes them effective in the invention. The cosine weighting can be expressed as:

$$\cos\left(\frac{2\pi x}{d}\right) = \frac{1}{2}\left[\exp\left(i\frac{2\pi x}{d}\right) + \exp\left(-i\frac{2\pi x}{d}\right)\right] \quad (6)$$

One way to interpret the right-hand side of Eq. (6) is that these are the phase delays (usually expressed as complex exponentials) corresponding to the steering delays required to steer the beam in the two desired directions.

The cosinusoidal apodization as in Eq. (2) is a relatively simple expression and has limited range of validity in an application such as medical ultrasound. A more generally applicable expression can be developed with the following analysis which is based on the assumption of a Gaussian transmit waveform and single scattering from the targets. An expression for the point spread function (PSF) is formed by summing the transmitted and received signals. By varying the apodization function used during the transmit operation, a beam with multiple peaks can be generated. The nature of the apodization function is defined as part of the following derivation.

It is assumed that the echo received at element n, given a transmitted Gaussian signal s(t) with bandwidth B and a scatterer at location $R_s$, is given by $$s(\vec{r}_n, \vec{R}_s, \vec{r}_m, t) = K\exp\left(j\omega_c\left[t - \frac{\{|\vec{R}_s - \vec{r}_n| + |\vec{R}_s - \vec{r}_m|\}}{c_s}\right]\right) \times \tag{7}$$

$$\exp\left(-\frac{B^2}{4}\left[t - \frac{\{|\vec{R}_s - \vec{r}_n| + |\vec{R}_s - \vec{r}_m|\}}{c_s}\right]^2\right)$$

In this expression, K includes the contributions of all constants or slowly varying factors such as the obliquity factor, and $r_m$ and $r_n$ are the locations of the transmit and receive elements, respectively. The first exponential term signifies the phase of the carrier that results from the propagation from the transmitting element to the scatterer and back to the receiving element and the second exponential signifies the associated envelope.

The properties of images that are derived from a B-mode imaging system that focuses the transmitted signals at a single point, and subsequently focuses the received echo signals from each firing at many points, can now be demonstrated. The transmitted elemental pulses are time delayed so that the coherent sum of the transmitted elemental signals focuses at a single separate point for each firing of the array. On receive, the echo time-sampled coherent signals are first accumulated at each element. The focus-on-receive signals are then constructed from the coherent sum of the individual elemental time samples, where individual time samples are chosen commensurate with the propagation time for a signal to travel from the receive foci to the individual elements.

For example, the focus on transmit at $R_s$ is accomplished by firing the first element at the time $t_{01}$. Using $t_{01}$ as a reference time, the other elements are fired at times $$\left\{t_{om} = t_{01} + \frac{|\vec{R}_f - \vec{r}_1|}{c_s} - \frac{|\vec{R}_f - \vec{r}_m|}{c_s}\right\},$$

and $t_f = t_{01} + \frac{|\vec{R}_f - \vec{r}_1|}{c_s}$.

A measure of the spread of the imaging beam pattern (or the PSF) can be obtained by generating the sidelobe response function of the imaging system. The PSF, $I(\vec{R}_s - \vec{R}_f)$, may be defined as the magnitude of the coherent signal obtained from the sum across the array of all the elemental time samples that are chosen specifically as the focus-on-receive samples for a point scatterer at $\vec{R}_s$. In the analysis, an infinite temporal sampling rate is assumed, which allows the choice of the exact time sample commensurate with a single focus-on-receive point.

The time-sampled signal at the n-th receiver used to focus-on-receive at the point $\vec{R}_s$ is given by $$s\left(\vec{R}_s, t = t_f + \frac{|\vec{R}_f - \vec{r}_1|}{c_s}\right) = \tag{8}$$

$$\sum_m |w_m| s\left(\vec{r}_n, \vec{R}_s, \vec{r}_m, t = t_f + \frac{|\vec{R}_s - \vec{r}_n|}{c_s}\right) =$$

$$K\sum_m w_m \exp\left[\frac{j2\pi(|\vec{R}_f - \vec{r}_m| - |\vec{R}_s - \vec{r}_m|)}{\lambda_c}\right]$$

$$\exp\left[-B^2\frac{(|\vec{R}_f - \vec{r}_m| + |\vec{R}_s - \vec{r}_m|)^2}{4c_s}\right]$$

Here, all the constants have been lumped into a constant K which will be used as a generic constant in the following discussion. The PSF is given by $$I(\vec{R}_s, \vec{R}_f) = \left|\sum_n s\left(\vec{R}_s, t = t_f + \frac{|\vec{R}_s - \vec{r}_n|}{c_s}\right)\right|. \tag{9}$$

For conventional windowing functions characterized by $w_m \geq 0$, for all m, $I(\vec{R}_s, \vec{R}_f)$ has a maximum at $\vec{R}_f = \vec{R}_s$.

In general, element weighting functions in beamforming can be complex. As an example, $$w_m = |\gamma_m|\left\{\exp\left[j2\frac{\pi(|\vec{R}_f + \delta - \vec{r}_m| - |\vec{R}_f - \vec{r}_m|)}{\lambda_c}\right]\right\}. \tag{10}$$

The phase arguments in Eq. (8) now have the form $$|\vec{R}_f + \delta - \vec{r}_m| - |\vec{R}_s - \vec{r}_m|.$$

Here $I(\vec{R}_s, \vec{R}_f)$ will have a maximum at a displaced focal point, $\vec{R}_f + \vec{\delta} = \vec{R}_s$.

Apodization functions that are a linear combination of two exponentials can be considered as a second example, such as $$w_{m\pm} = |\gamma_m|\left\{\exp\left[j2\frac{\pi(|\vec{R}_f + \delta - \vec{r}_m| - |\vec{R}_f - \vec{r}_m|)}{\lambda_c}\right] \pm \tag{11}\right.$$

$$\left.\exp\left[j2\frac{\pi(|\vec{R}_f - \delta - \vec{r}_m| - |\vec{R}_f - \vec{r}_m|)}{\lambda_c}\right]\right\}$$

For these weightings, $I(\vec{R}_s, \vec{R}_f)$ will have two local maxima at $\vec{R}_s = \vec{R}_f \pm \vec{\delta}$.

For the present invention, the focus is on uniform linear phased arrays with element spacings d equal to one-half of one wavelength, $\lambda$, associated with the central frequency of the broadband ultrasound waveform. The concepts of beam steering and beam splitting introduced herein are also applicable to higher-order 2-D and 3-D arrays. For a 1-D uniform linear phased array with N elements, the element vectors $\vec{r}_m$ are represented by $$\vec{r}_m = \left[-\frac{(N-1)}{2} + (m-1)\right] d\vec{n}_{par}, \text{ for } m = 1, 2, \ldots, N.$$

The unit vector $\vec{n}_{par}$ is parallel to the array.

In a polar angular B-mode scan the transmit focal distances are often dynamically changed to image various depth zones. For a specific focal zone a fixed focal length scan corresponds to a pure rotation, which in turn restricts the choice of shift vectors $\vec{\delta}$ described above to satisfy the constraint relation:

$$|\vec{R}_f \pm \vec{\delta}| = \vec{R}_f.$$

It is advantageous to express these relations in terms of spatial frequencies. For a 1-D linear phased array system, the spatial frequencies are defined as $$f_s = \frac{1}{\lambda_c} \sin\theta,$$

where $\theta$ is the polar angle with the polar axis along the normal (boresight axis) of the linear array. The spatial frequencies associated with the transmit foci are $$f_{s0} = \frac{\vec{n}_{par} \cdot \vec{R}_f}{\lambda_c R_f}.$$

The shifted foci have the spatial frequencies $$f_{s0} \pm \delta_f = \frac{\vec{n}_{par} \cdot (\vec{R}_f \pm \vec{\delta})}{\lambda_c R_f}, \text{ where } \delta_f \equiv \frac{\vec{n}_{par} \cdot \vec{\delta}}{\lambda_c R_f}.$$

For these constrained polar shifts, the terms in the exponents of Eqs. (10) and (11) can be expanded in a Taylor series expansion:

$$|\vec{R}_f \pm \vec{\delta} - \vec{r}_m| = R_f \left[1 - \frac{2\vec{r}_m \cdot (\vec{R}_f \pm \vec{\delta})}{R_f^2} + \frac{r_m^2}{R_f^2}\right]^{1/2} \quad (12)$$

$$\equiv R_f \left[1 - \frac{2\lambda_c r_m (f_{s0} \pm \vec{\delta}_f)}{R_f} + \frac{r_m^2}{R_f^2}\right]^{1/2}$$

$$= R_f - \lambda_c r_m (f_{s0} \pm \delta_f) +$$

$$\frac{r_m^2}{2R_f} \left[1 - \lambda_c^2 (f_{s0} \pm \delta_f)^2\right] + O\left(\frac{\lambda_c r_m^3 f_s}{R_f^2}\right).$$

The higher-order terms in the expansion can be neglected in the regime of interest. For the 1-D case, the apodization functions in Eq. (11) can be taken as $$w_{m+} = |\gamma_m| \exp\left(\frac{-j2\pi\lambda_c r_m^2 \delta_f^2}{R_f}\right) \cos\left(2\pi r_m \delta_f \left[1 + \frac{\lambda_c r_m f_{s0}}{R_f}\right]\right) \quad (13)$$

and $$w_{m-} = |\gamma_m| \exp\left(\frac{-j2\pi\lambda_c r_m^2 \delta_f^2}{R_f}\right) \sin\left(2\pi r_m \delta_f \left[1 + \frac{\lambda_c r_m f_{s0}}{R_f}\right]\right). \quad (14)$$

The original cosinusoidal apodization function (see Eq. (2)) is of the form $w_m = |\gamma_m| \cos(2\pi r_m \delta_f)$. The additional terms that result from the more detailed theoretical analysis given herein will improve performance at large scan angles and large dual beam separation angles.

In principle, $M \leq N$ local spatial frequency maxima can be constructed by choosing a complex weighting corresponding to a linear combination of spatial frequencies. The spacing between the spatial frequencies must exceed the Rayleigh spatial frequency resolution of the system. For a narrow-band system of wavelength $\lambda_c$, the Rayleigh spatial frequency interval associated with a linear phased array of length $(N-1)\lambda_c/2$ is $\delta_{fRayl} = \sin(2/(N-1))/\lambda_c$. In practice, multiple beam generation is most effective when M is relatively small. The general expression for the complex apodization function for an M-th order split beam is given by $$w_m = \sum |\gamma_{ml}| \exp\left[j2\pi \frac{\left(|\vec{R} + \vec{\delta}_l - \vec{r}_m| - |\vec{R}_f - \vec{r}_m|\right)}{\lambda_c}\right]. \quad (15)$$

The generation of four beams that are symmetrically displaced about the single B-mode scan focal point at displacements $\pm\delta_{f1}$ and $\pm\delta_{f2}$ may be considered as an example. The $\delta$'s are chosen to be small enough that the exponential phase term in Eq. (13) can be neglected. This corresponds to the condition $\lambda_c L^2 \delta_f^2 / 4R_f \ll 1$. A four-beam apodization function can be constructed of the form:

$$w_m = \quad (16)$$

$$|\gamma_m| \left[\cos\left(2\pi r_m \delta_{f1}\left[1 + \frac{\lambda_c r_m f_{s0}}{R_f}\right]\right) + b\cos\left(2\pi r_m \delta_{f2}\left[1 + \frac{\lambda_c r_m f_{s0}}{R_f}\right]\right)\right].$$

Figure 4:
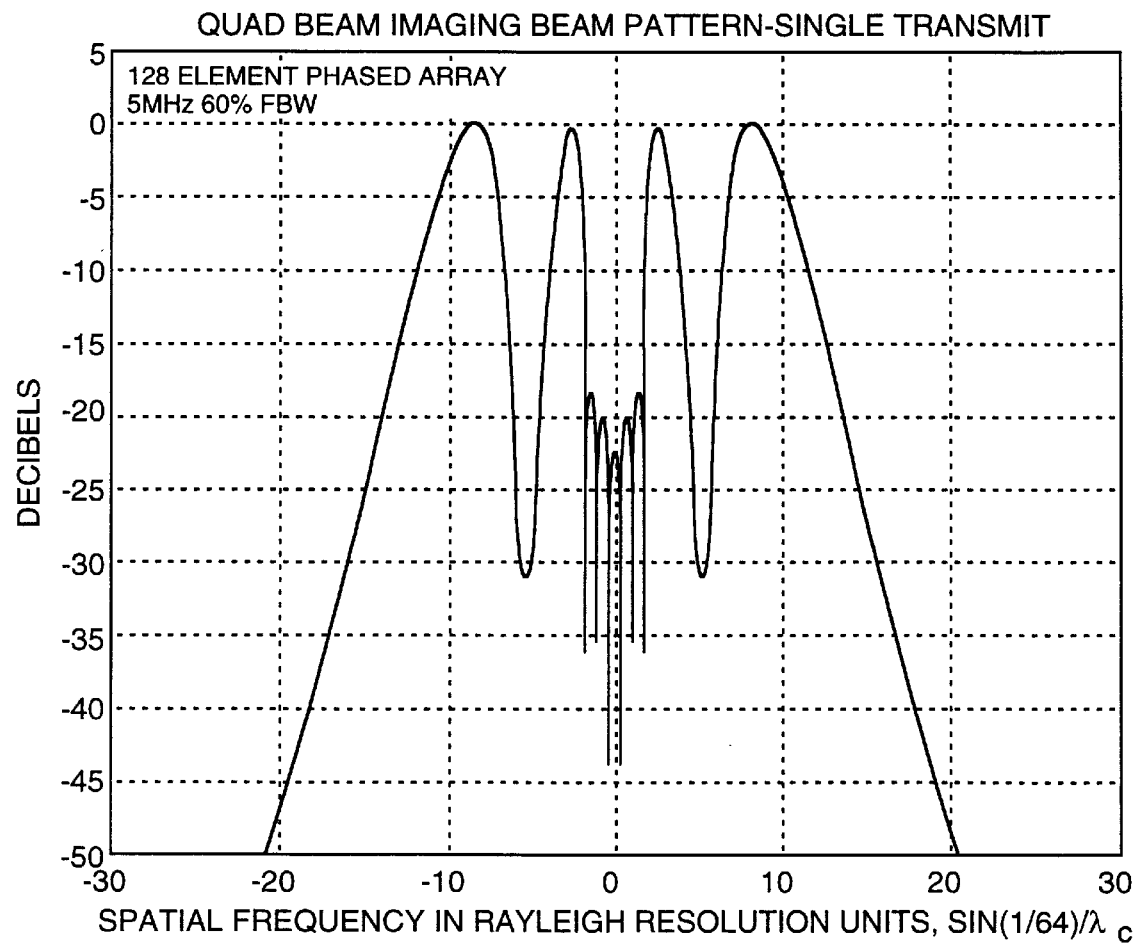
FIG. 4 is a graph showing the quad beam profile resulting from application of a transmit apodization weighting function to a 128-element phased array in accordance with another preferred embodiment of the invention.

As an example of this quad beam construction, a simulation of the PSF was performed for a 129-element linear phased array using the apodization function from Eq. (16) with $|\gamma_m|=1$ for all m, $\delta_{f1} = 3\sin(\frac{1}{64}\lambda_c)$, $\pm\delta_{f2} = 3\delta_{f1}$ and b=2.8. The transmit focus was at $f_{s0}=0$ at f/1.5. The Gaussian waveforms have a central frequency of 5 MHz with a 60% fractional bandwidth. The simulation results are illustrated in FIG. 4. This demonstrates the extension of the concept to the transmission of multiple physically separate beams from a single firing of the transducer elements. It also shows the extension of the simple cosinusoidal weighting (Eq. (6)) to a more complete expression which covers complex multi-beam situations.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A system for imaging ultrasound scatterers, comprising:
   an ultrasound transducer array for transmitting ultrasound waves and detecting ultrasound echoes reflected by said ultrasound scatterers, said transducer array comprising a multiplicity of transducer elements;
   a multiplicity of pulsers respectively coupled to said multiplicity of transducer elements for pulsing selected transducer elements which form a transmit aperture in response to a multiplicity of pulser activation signals;

a transmit beamformer for generating said multiplicity of pulser activation signals with respective predetermined time delays corresponding to a focused ultrasound beam having a predetermined steering angle relative to an axis normal to said transducer array;

an apodization generator for applying respective apodization weighting factors to said multiplicity of pulsers during a transmit firing of said selected transducer elements, said respective apodization weighting factors being determined in accordance with an apodization function having the property that said selected transducer elements transmit first and second ultrasound beams having first and second steering angles respectively during said transmit firing, said first and second ultrasound beams being displaced relative to, and on opposite sides of, said predetermined steering angle;

a receiver coupled to said transducer array for receiving a set of receive signals from selected transducer elements which form a receive aperture subsequent to said transmit firing;

a receive beamformer for forming first and second beamsummed receive signals from said set of receive signals, said first beamsummed receive signal corresponding to said first steering angle and said second beamsummed receive signal corresponding to said second steering angle; and a display monitor for displaying an image having a first scan line which is a function of said first beamsummed receive signal and a second scan line which is a function of said second beamsummed receive signal.

2. The system as defined in claim 1, wherein said first steering angle is greater than said predetermined steering angle and said second steering angle is less than said predetermined steering angle.

3. The system as defined in claim 1, wherein said apodization function is cosinusoidal.

4. The system as defined in claim 1, wherein said apodization function is sinusoidal.

5. A method for imaging ultrasound scatterers, comprising the steps of:

generating a multiplicity of pulser activation signals with respective predetermined time delays corresponding to a focused ultrasound beam having a predetermined steering angle relative to an axis normal to a transducer array comprising a multiplicity of transducer elements;

pulsing selected transducer elements of said array to form a transmit aperture in response to a multiplicity of pulser activation signals, each of said selected transducer elements being pulsed with a respective transducer drive signal during a transmit firing;

applying a multiplicity of apodization weighting factors to said transducer drive signals such that each of said transducer drive signals is a function of a respective apodization weighting factor and a respective pulser activation signal, said respective apodization weighting factors being determined in accordance with an apodization function having the property that said selected transducer elements transmit first and second ultrasound beams having first and second steering angles respectively during said transmit firing, said first and second ultrasound beams being displaced relative to, and on opposite sides of, said predetermined steering angle;

receiving a set of receive signals from selected transducer elements which form a receive aperture subsequent to said transmit firing;

beamforming first and second beamsummed receive signals from said set of receive signals, said first beamsummed receive signal corresponding to said first steering angle and said second beamsummed receive signal corresponding to said second steering angle; and displaying an image having a first scan line which is a function of said first beamsummed receive signal and a second scan line which is a function of said second beamsummed receive signal.

6. The method as defined in claim 5, wherein said first steering angle is greater than said predetermined steering angle and said second steering angle is less than said predetermined steering angle.

7. The method as defined in claim 5, wherein said apodization function is cosinusoidal.

8. The method as defined in claim 5, wherein said apodization function is sinusoidal.

9. A system for transmitting at least two ultrasound beams during a single transmit firing, comprising:

an ultrasound transducer array for transmitting ultrasound waves and detecting ultrasound echoes reflected by said ultrasound scatterers, said transducer array comprising a multiplicity of transducer elements;

a multiplicity of pulsers respectively coupled to said multiplicity of transducer elements for pulsing selected transducer elements which form a transmit aperture in response to a multiplicity of pulser activation signals;

a transmit beamformer for generating said multiplicity of pulser activation signals with respective predetermined time delays corresponding to a focused ultrasound beam having a predetermined steering angle relative to an axis normal to said transducer array; and an apodization generator for applying respective apodization weighting factors to said multiplicity of pulsers during a transmit firing of said selected transducer elements, said respective apodization weighting factors being determined in accordance with an apodization function having the property that said selected transducer elements transmit first and second ultrasound beams having first and second steering angles respectively during said transmit firing, said first and second ultrasound beams being displaced relative to, and on opposite sides of, said predetermined steering angle.

10. The system as defined in claim 9, wherein said first steering angle is greater than said predetermined steering angle and said second steering angle is less than said predetermined steering angle.

11. The system as defined in claim 9, wherein said apodization function is cosinusoidal.

12. The system as defined in claim 9, wherein said apodization function is sinusoidal.

* * * * *